Feb. 17, 1970 — L. P. GRANT — 3,496,264
METHOD FOR PRODUCING DECORATIVE TILE
Original Filed May 12, 1964 — 2 Sheets-Sheet 1
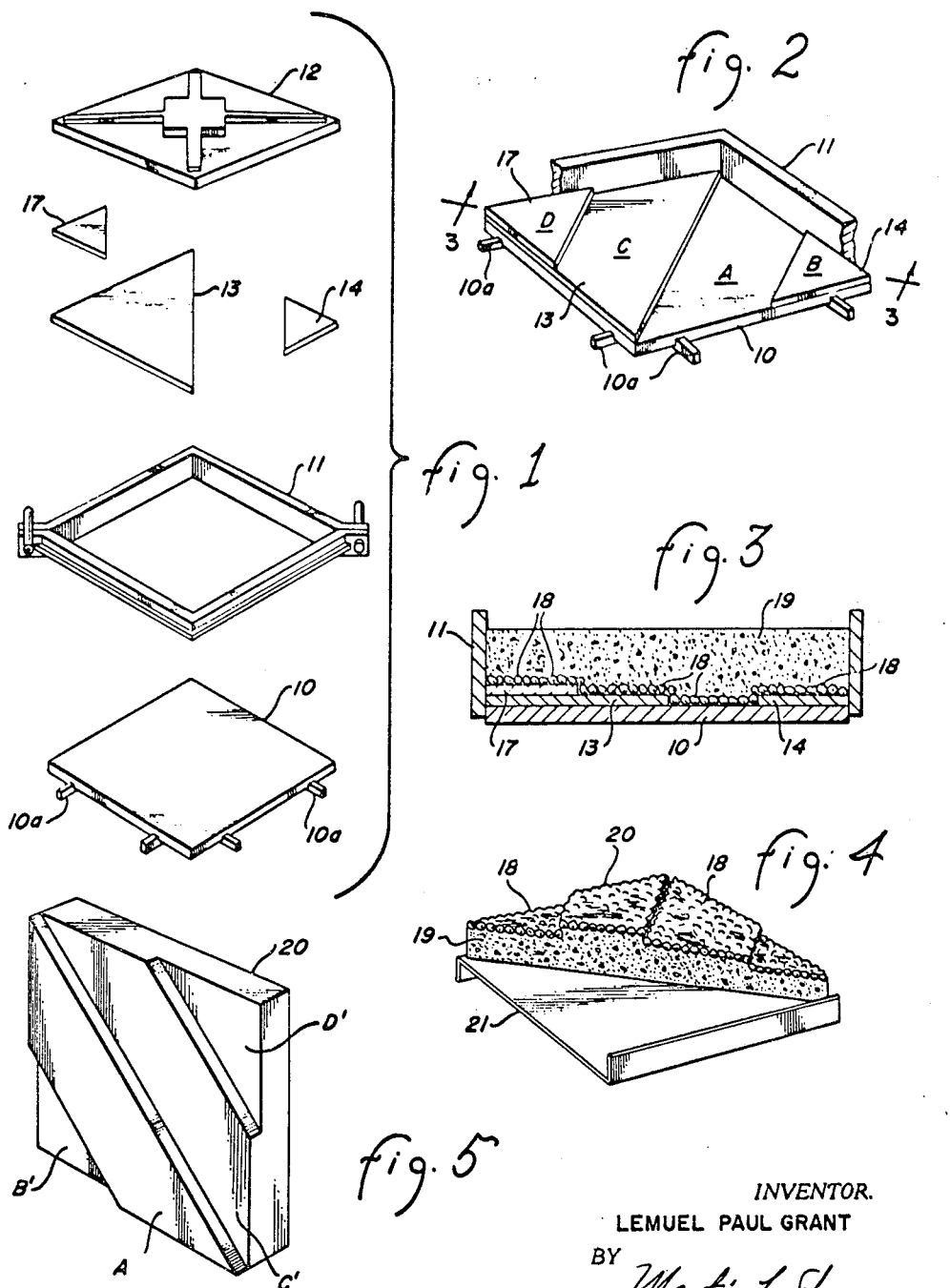
INVENTOR.
LEMUEL PAUL GRANT
BY Martin L. Stoneman
ATTORNEY Feb. 17, 1970     L. P. GRANT     3,496,264
METHOD FOR PRODUCING DECORATIVE TILE
Original Filed May 12, 1964     2 Sheets-Sheet 2
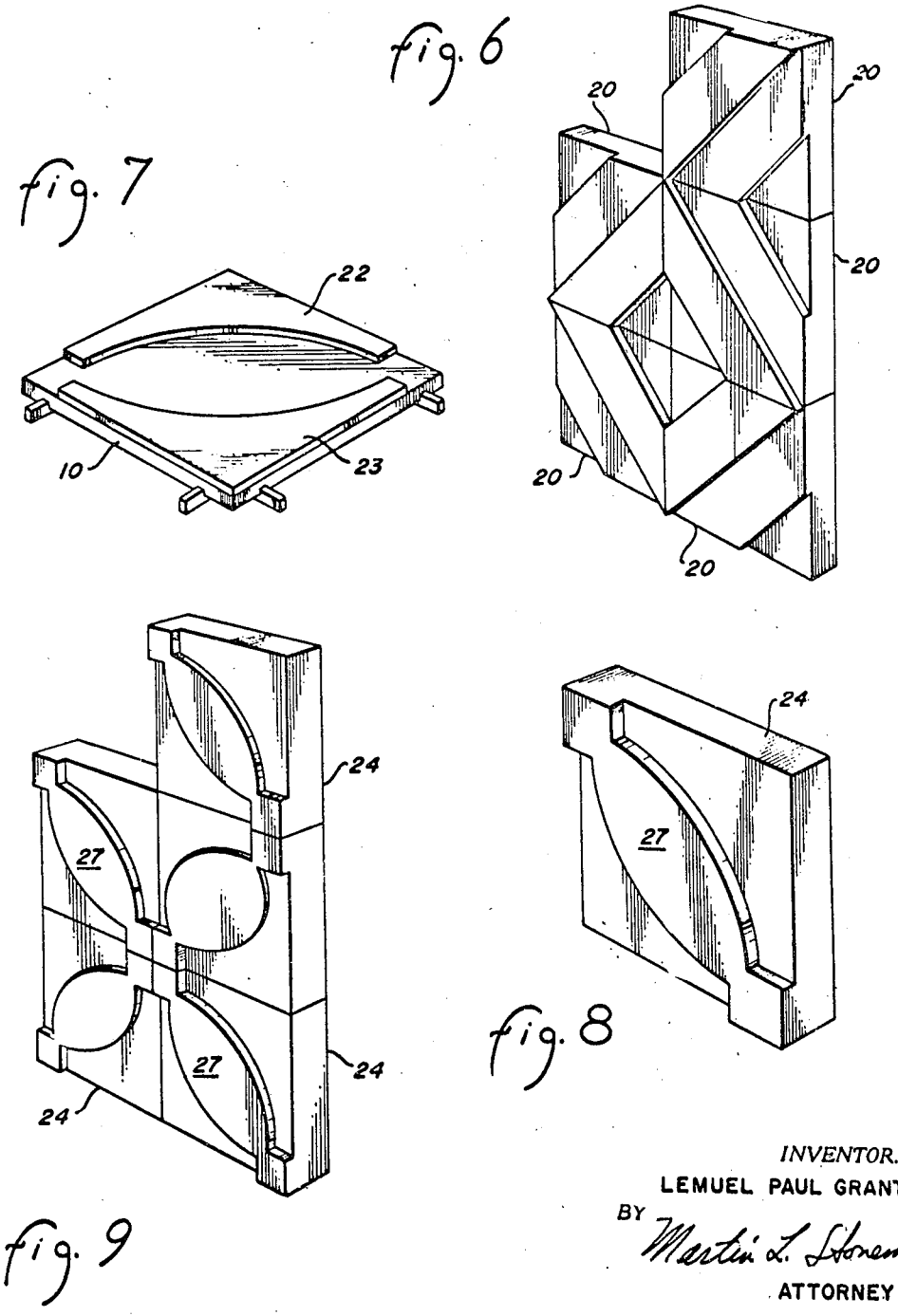
INVENTOR.
LEMUEL PAUL GRANT
BY Martin L. Stoneman
ATTORNEY

United States Patent Office 3,496,264
Patented Feb. 17, 1970

3,496,264
METHOD FOR PRODUCING DECORATIVE TILE
Lemuel P. Grant, 300 Rose Ave., Oxnard, Calif. 93030
Continuation of application Ser. No. 366,925, May 12, 1964. This application July 12, 1967, Ser. No. 652,950
Int. Cl. B28b 23/00; B25b 21/82
U.S. Cl. 264—245          1 Claim

ABSTRACT OF THE DISCLOSURE

A method of producing decorative construction tile having an intaglio surface. The tile is formed by first providing a mold having contoured insets arranged upon a base plate to form a multi-plane base. Next, different sized aggregates are placed upon different planes of the multi-plane base and cement is poured over the aggregates to fill the mold. The cement is compressed and subsequently cured to produce the decorative tile.

CROSS-REFERENCE TO RELATED APPLICATION

This is a continuation to my co-pending application Ser. No. 366,925 filed May 12, 1964, now abandoned.

BACKGROUND OF THE INVENTION

This invention relates to masonry construction material.

More particularly, this invention concerns decorative construction tile.

In a further aspect, the invention concerns decorative construction tile having an intaglio frontal surface.

In a still further aspect, the invention concerns a method of producing decorative tile of the above type in a mold having multi-plane base.

Molded masonry products are a common construction media. Exemplary of such masonry products are adobe brick, clay tile, and cement blocks. Primarily, these materials must incorporate the required structural strength. Secondly, they should lend esthetic value to the construction.

Certain masonry construction material, i.e. adobe brick, has both structural strength and esthetic value. Other masonry building materials, as, for example, cement blocks, have high structural strength but demonstrate little esthetic value. It is therefore customary to face such construction with a relatively thin veneer of decorative material. An exceedingly popular veneer is decorative tile. Most ornamental tiles require inlays of metal, or specially cut and polished stone, or special mixtures of composition, or special molding apparatus.

It would be highly advantageous, therefore to provide a simplified method of forming decorative construction tile employing standard equipment and materials.

SUMMARY OF THE INVENTION

Accordingly, it is a primary object of the present invention to provide a decorative construction tile of unique ornamental characteristics.

It is a further object of the present invention to provide a decorative tile which is complementary to the adjacent tiles when positioned during construction.

It is a still further object of the present invention to provide a molded ornamental tile which may be formed in conventional molds.

A still further object of the present invention is to provide a method of producing an ornamental tile of the type above, which is relatively inexpensive and utilizes standard construction materials.

Briefly, to achieve the desired objectives of my present invention, I provide a set of insets for use in conventional concrete tile molds. The insets lie flat upon the base plate of the mold and are positioned by abutting the mold frame. The insets, therefore, create a multi-plane mold base. Aggregate material, after having been prepared and sized according to conventional practice, is deposited within the mold in a layer sufficient to cover the base. An ordinary concrete mixture is then distributed over the aggregate to the desired thickness. Again in accordance with conventional practice, the mold top plate is emplaced and the proper amount of pressure applied. The top plate is then removed, the mold inverted upon a pallet, and removed from the tile formed therein. The tile remains upon the pallet for subsequent drying and curing.

Due to the multi-plane mold base plate, the tile thus produced will have an intaglio outer surface. It will be immediately apparent to those skilled in the art that each surface of the multi-plane base plate may be covered with an aggregate of different color or texture from the adjacent surface to produce a colored relief tile face. Further, the edges of the insets may be contoured to achieve further ornamental design and esthetic value.

BRIEF DESCRIPTION OF THE DRAWINGS

The objects and advantages of the invention will become apparent to those skilled in the art from the following detailed description of the present invention, taken in conjunction with the drawings, in which:

FIG. 1 is an exploded perspective view of a conventional tile mold embodying the insets of the present invention;

FIG. 2 is a partial perspective view of the assembled elements of the device of FIG. 1;

FIG. 3 is an elevational view, in section, taken along line 3—3 of FIG. 2, after the tile forming aggregate and cement mixture have been deposited therein;

FIG. 4 is a perspective view, partly in section, showing the tile removed from the mold and placed upon the pallet for curing;

FIG. 5 is a perspective view of the finished tile produced in the mold of FIG. 1;

FIG. 6 is a perspective view of a portion of veneer facing created by an arrangement of several of the tiles illustrated in FIG. 5;

FIG. 7 is a perspective view of a mold base plate and emplaced insets for an alternate tile design;

FIG. 8 is a perspective view representative of the tile produced by the insert pattern of FIG. 7; and FIG. 9 is a perspective view of a portion of veneer facing created by an arrangement of several of the tiles illustrated in FIG. 8.

DESCRIPTION OF THE PREFERRED EMBODIMENTS

Turning now to the drawings in which the same reference numerals indicate corresponding elements through the several views, FIG. 1 illustrates a conventional concrete mold having a base plate 10, a frame mold 11, and a top plate 12. In accordance with conventional practice, the mold frame 11 encompasses the perimeter of the base plate 10, and rests upon the lugs 10a. This embodiment employs a series of insets having a first triangular plate 13, a second triangular plate 14, and a third triangular plate 17.

FIG. 2 illustrates the assembled arrangement of the elements of FIG. 1. The insets are positioned by abutting the inner edges of the mold frame 12. As herein illustrated, the insets create a multi-plane mold base. The base plate 10 provides the nethermost plane A, the inset 14 provides the plane B, the inset 13 provides the plane C of the same height as the plane B, and the inset 17 creates the plane D.

FIG. 3 further illustrates the multi-plane base plate created by the insets. Aggregate 18, preferably crushed stone, prepared in the conventional manner of tumbling and sizing, has been distributed over the base. The mold is then substantially filled with a concrete mixture 19. In accordance with conventional practice, the top plate 12 is then inserted into the frame 11. The mold is then inserted into a press and the required pressure applied.

FIG. 4 illustrates the molded and pressed tile generally designated by the reference character 20 removed from the mold subsequent to the operation described in connection wth FIG. 3, and placed upon a pallet 21 where it remains for drying and curing.

FIG. 5 illustrates the finished title 20. Especially noted is the intaglio surface having surfaces A', B', C', and D' corresponding to the surfaces A, B, C, and D respectively of FIG. 2.

FIG. 6 shows several of the assembled tiles 20. Particularly noted in this view is the complementary assembly of the blocks to create an integral design from block to block.

FIG. 7 illustrates another pattern employing insets 22 and 23. The insets are laid upon the base plate 10 and positioned against the mold frame 11 analagous to the description of FIG. 2. In this embodiment the insets 22 and 23 have outwardly inboard edges to create a double convex surface on the plane of the base plate 10.

FIG. 8 specifically illustrates a tile 24 produced by the mold pattern of FIG. 7. Especially noted is the raised portion 27 corresponding to the exposed surface of the base plate 10.

FIG. 9 illustrates a complementary arrangement of the tiles 24. It will be immediately apparent to those skilled in the art that the raised surface 27 may have a contrasting color from the adjacent face of the tile. This may be created simply by depositing one color of aggregate upon the exposed portion of the base plate 10 and another color of aggregate upon the insets 22 and 23.

To enchance the color of the aggregate in a multi-color tile, a mixture of white cement and sand of the color of the aggregate may be poured over the aggregate prior to the addition of the concrete mixture. After removing the tile from the mold, the loose sand is brushed from the face of the tile and from between the aggregate.

Various changes and modifications in the device and method chosen for purposes of illustration will readily occur to persons skilled in the art having regard for the disclosure thereof. While the description of the preferred embodiment was limited to two styles of decorative tile, it is apparent that an infinite variety may be produced using the concept of the invention and variously shaped insets.

Having fully described the invention in such manner as to enable those skilled in the art to understand and practice the same, I claim:

1. A method of producing decorative construction tile having an intaglio surface, said method comprising the steps of:
(a) preparation of a first sized aggregate;
(b) preparation of a second sized aggregate;
(c) assembling a mold having a multi-plane base by:
(1) providing shaped insets for subsequent positioning upon a mold base plate,
(2) positioning a mold frame about the perimeter of the base plate, and
(3) arranging said insets into a predetermined pattern upon the mold base plate to obtain a multi-plane surface, said insets lying flat and being placed into abutting relationship with
(4) the inner edges of said mold frame;
(d) depositing said first sized aggregate within said mold upon one plane of said base plate;
(e) depositing said second sized aggregate within said mold upon a second plane of said base plate;
(f) pouring cement over said aggregate to approximately fill said mold;
(g) compressing the contents of said mold;
(h) removing the contents of said mold;
(i) placing said contents on a pallet; and
(j) curing said contents.

References Cited

UNITED STATES PATENTS

| 1,619,759 | 3/1927 | Proctor et al. | |
| 1,634,740 | 7/1927 | Dale. | |
| 1,684,525 | 9/1928 | Tomarin | 264—256 X |
| 1,747,249 | 2/1930 | Korompay | 264—256 |
| 3,097,080 | 7/1963 | Weir | 264—256 X |
| 3,242,242 | 3/1966 | Bournique | 264—256 X |
| 3,333,035 | 7/1967 | Williams | 264—256 X |
| 2,835,996 | 5/1958 | DePaoli | 264—162 X |

FOREIGN PATENTS 410,622    5/1934    Great Britain.

ROBERT F. WHITE, Primary Examiner

K. J. HOVET, Assistant Examiner

U.S. Cl. X.R.

25—41; 249—156; 264—256, 333